United States Patent
Lim et al.

(10) Patent No.: US 12,187,835 B2
(45) Date of Patent: Jan. 7, 2025

(54) PROCESS FOR PREPARING A CATALYST FOR OLEFIN POLYMERIZATION

(71) Applicant: HANWHA SOLUTIONS CORPORATION, Seoul (KR)

(72) Inventors: Seongjae Lim, Daejeon (KR); Hye Ran Park, Daejeon (KR); Ui Gap Joung, Daejeon (KR); Tae Uk Jeong, Daejeon (KR); Seungil Choi, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 798 days.

(21) Appl. No.: 17/312,447

(22) PCT Filed: Dec. 5, 2019

(86) PCT No.: PCT/KR2019/017052
§ 371 (c)(1),
(2) Date: Jun. 10, 2021

(87) PCT Pub. No.: WO2020/122500
PCT Pub. Date: Jun. 18, 2020

(65) Prior Publication Data
US 2022/0049026 A1  Feb. 17, 2022

(30) Foreign Application Priority Data

Dec. 11, 2018 (KR) .................. 10-2018-0159163

(51) Int. Cl.
C08F 4/659 (2006.01)
C08F 4/6592 (2006.01)

(52) U.S. Cl.
CPC ...... *C08F 4/65916* (2013.01); *C08F 4/65912* (2013.01); *C08F 4/65927* (2013.01); *C08F 2410/02* (2013.01)

(58) Field of Classification Search
CPC ...... C08F 4/65927; C08F 4/02; C08F 210/16; C08F 2420/10; C08F 4/65916; C08F 4/65912; C08F 2410/02

USPC ................ 502/104, 117, 150, 158
See application file for complete search history.

(56) References Cited

U.S. PATENT DOCUMENTS

| | | | |
|---|---|---|---|
| 6,300,436 B1 | 10/2001 | Agapiou | |
| 6,482,765 B1 * | 11/2002 | Ohgane | C08F 10/00 526/943 |
| 8,735,514 B2 | 5/2014 | Baita | |
| 11,267,917 B2 * | 3/2022 | Joung | C08F 4/6592 |
| 2018/0273655 A1 | 9/2018 | Kuo | |

FOREIGN PATENT DOCUMENTS

| | | | | |
|---|---|---|---|---|
| CN | 1307598 A | 8/2001 | | |
| EP | 0930320 A1 * | 7/1999 | | C08F 210/16 |
| JP | 2002516357 A | 6/2002 | | |
| JP | 2007291404 A | 11/2007 | | |
| KR | 1020130099954 A | 9/2013 | | |
| KR | 10-2014-0121771 | * 10/2014 | | C08F 10/00 |
| KR | 1020140121771 A | 10/2014 | | |
| KR | 1020160121705 A | 10/2016 | | |
| KR | 10-1711788 B1 | 3/2017 | | |

OTHER PUBLICATIONS

CN Office Action dated Sep. 27, 2022.
International Search report dated Apr. 2, 2020.
European Search Report dated Jul. 6, 2022.
JP Office Action dated Jun. 7, 2022.
An office action issued on Apr. 17, 2023.

* cited by examiner

*Primary Examiner* — Patricia L. Hailey
(74) *Attorney, Agent, or Firm* — Harvest IP Law, LLP

(57) ABSTRACT

The present invention relates to a process for preparing a catalyst for olefin polymerization. Specifically, the present invention relates to a process for preparing a supported metallocene catalyst capable of enhancing the operational stability during olefin polymerization by treating the supported metallocene catalyst with an antistatic agent. In the process for preparing a supported metallocene catalyst according to the embodiment of the present invention, it is possible to enhance the operational stability during olefin polymerization by treating the supported metallocene catalyst with an antistatic agent in an improved method.

12 Claims, No Drawings

PROCESS FOR PREPARING A CATALYST FOR OLEFIN POLYMERIZATION

CROSS-REFERENCE TO RELATED APPLICATIONS

This application is a National Stage of International Application No. PCT/KR2019/017052 filed Dec. 5, 2019, claiming priority based on Korean Patent Application No. 10-2018-0159163 filed Dec. 11, 2018.

TECHNICAL FIELD

The present invention relates to a process for preparing a catalyst for olefin polymerization. Specifically, the present invention relates to a process for preparing a supported metallocene catalyst capable of enhancing the operational stability during olefin polymerization by treating the supported metallocene catalyst with an antistatic agent.

BACKGROUND ART

A metallocene catalyst, which is one of the catalysts used in the polymerization of olefins, is a compound in which a ligand such as cyclopentadienyl, indenyl, and cycloheptadienyl is coordinated to a transition metal or a transition metal halide compound. It has a sandwich structure in its basic form.

In a Ziegler-Natta catalyst, which is another catalyst used in the polymerization of olefins, the metal component serving as the active sites is dispersed on an inert solid surface, whereby the properties of the active sites are not uniform. On the other hand, since a metallocene catalyst is a single compound having a specific structure, it is known as a single-site catalyst in which all active sites have the same polymerization characteristics. A polymer prepared by such a metallocene catalyst is characterized by a narrow molecular weight distribution and a uniform distribution of comonomers.

When an olefin is polymerized in a fluidized bed reactor using a metallocene catalyst, the reactor wall has a (+) charge through the contact with the polyolefin, and the polyolefin has a (−) charge. Meanwhile, when a supported metallocene catalyst is fed to the reactor, it has a (−) charge. Here, the metallocene catalyst with a (−) charge would move to the reactor wall due to electrostatic force. As a result, a hot spot or a polymer sheet may be formed near the reactor wall, which has a serious adverse effect on the operation.

In order to alleviate such operational instability, attempts have been made to mix an antistatic agent with a supported catalyst or inject it into a reactor together with a catalyst at the time of polymerization. However, when an antistatic agent is mixed with a supported catalyst, there is a problem in that the antistatic agent acts as a poison to the catalyst and that the activity of the catalyst deteriorates. Thus, improvements thereof are required.

DETAILED DESCRIPTION OF THE INVENTION

Technical Problem

An object of the present invention is to provide a process for preparing a supported metallocene catalyst capable of enhancing the operational stability during olefin polymerization.

Technical Solution

According to an embodiment of the present invention for achieving the object, there is provided a process for preparing a supported metallocene catalyst for olefin polymerization, which comprises (1a) adding a cocatalyst compound to at least one transition metal compound; or (1b) adding a cocatalyst compound to a carrier; (2) supporting the transition metal compound on a carrier; and (3) primarily treating the supported catalyst with a solution or suspension of an antistatic agent; and (4) secondarily treating the supported catalyst with dry powder of an antistatic agent.

Here, the transition metal compound may be one represented by the following Formula 1.

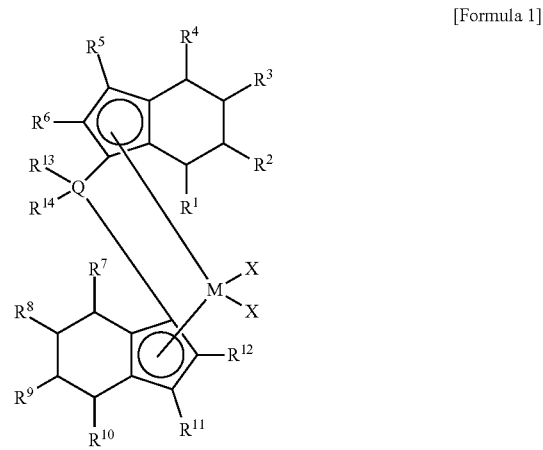

[Formula 1]

In Formula 1, M is a transition metal of Group 4 of the Periodic Table of the Elements;
Q is any one of carbon, silicon, germanium, and tin,
X is each independently a halogen atom, an alkyl group having 1-10 carbon atoms, or an alkenyl group having 2-10 carbon atoms,
$R^1$ to $R^{12}$ may each independently be one of a hydrogen atom, an alkyl group having 1-20 carbon atoms, a cycloalkyl group having 3-6 carbon atoms, and an aryl group having 6-14 carbon atoms, or when two adjacent $R^n$ and $R^{n+1}$ (where n is 1 to 11) among $R^1$ to $R^{12}$ form a mono- or multi-cyclic compound having 1-15 carbon atoms unsubstituted or substituted with an alkyl group having 1-4 carbon atoms, other Rs than $R^n$ and $R^{+1}$ may each independently be one of hydrogen, an alkyl group having 1-20 carbon atoms, a cycloalkyl group having 3-6 carbon atoms, and an aryl group having 6-14 carbon atoms, and
$R^{13}$ and $R^{14}$ are each independently an alkyl group having 1-10 carbon atoms or an aryl group having 6-14 carbon atoms.

Preferably, in Formula 1, M is zirconium, Q is silicon, X is each chlorine, $R^1$ to $R^{12}$ may each independently be one of a hydrogen atom, an alkyl group having 1-20 carbon atoms, a cycloalkyl group having 3-6 carbon atoms, and an aryl group having 6-14 carbon atoms, or when two adjacent $R^n$ and $R^{n+1}$ (where n is 1 to 11) among $R^1$ to $R^{12}$ form a mono- or multi-cyclic compound having 1-15 carbon atoms unsubstituted or substituted with an alkyl group having 1-4 carbon atoms, other Rs than $R^n$ and $R^{+1}$ may each independently be one of hydrogen, an alkyl group having 1-20 carbon atoms, a cycloalkyl group having 3-6 carbon atoms, and an aryl group having 6-14 carbon atoms, and $R^{13}$ and $R^{14}$ are each independently a methyl group.
More preferably, the transition metal compound represented by Formula 1 may be any one of the compounds represented by Formulae 1-1 and 1-16.
[Formula 1-1]
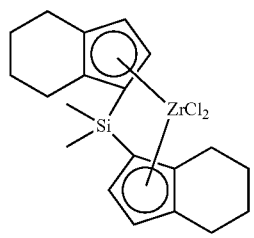
[Formula 1-2]
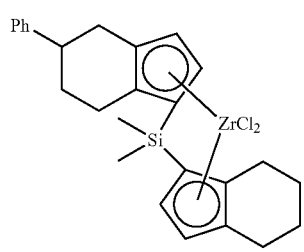
[Formula 1-3]
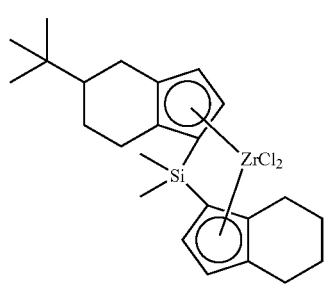
[Formula 1-4]
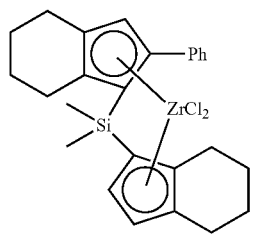
[Formula 1-5]
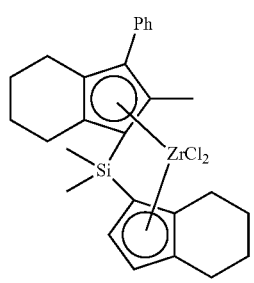
-continued
[Formula 1-6]
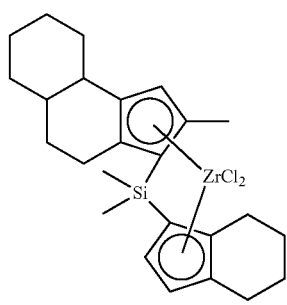
[Formula 1-7]
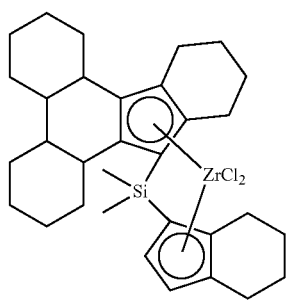
[Formula 1-8]
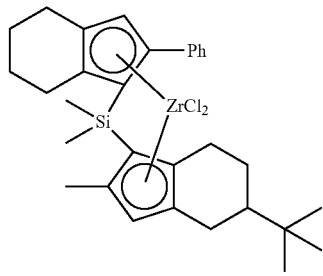
[Formula 1-9]
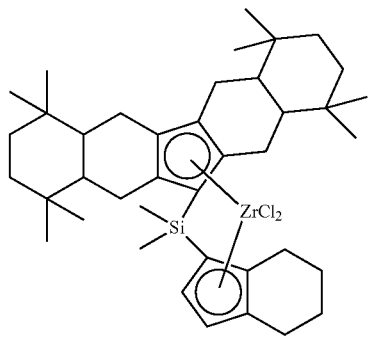
[Formula 1-10]
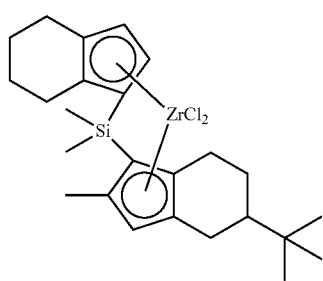

[Formula 1-11]
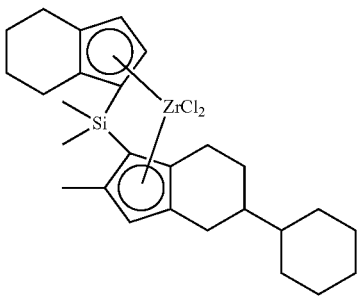

[Formula 1-12]
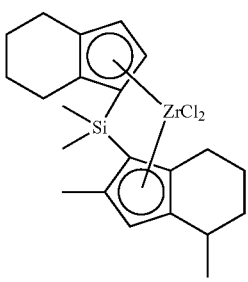

[Formula 1-13]
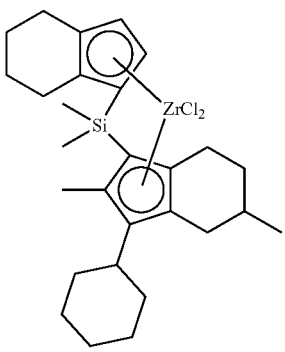

[Formula 1-14]
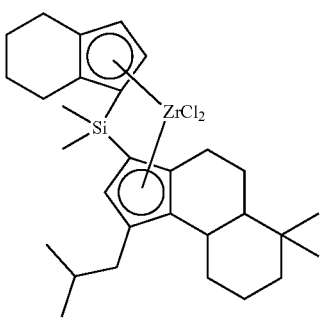

[Formula 1-15]
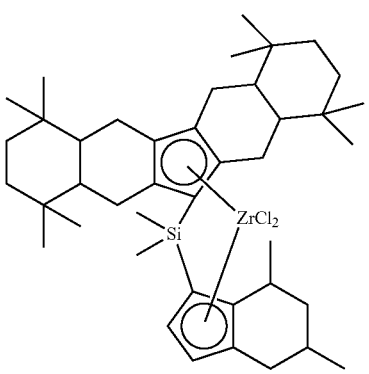

[Formula 1-16]
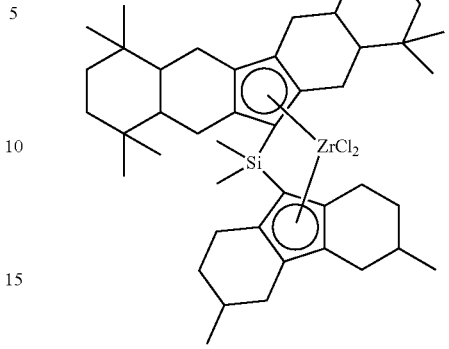

Most preferably, the transition metal compound represented by Formula 1 may be the compound represented by Formula 1-1.

Meanwhile, the cocatalyst compound may comprise at least one selected from the group consisting of a compound represented by Formula 2, a compound represented by Formula 3, and a compound represented by Formula 4.

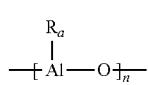

[Formula 2]

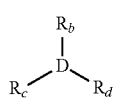

[Formula 3]

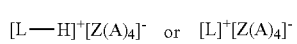

[Formula 4]

In Formula 2, n is an integer of 2 or more, and $R_a$ may each independently be a halogen atom, a hydrocarbon group having 1-20 carbon atoms, or a hydrocarbon group having 1-20 carbon atoms substituted with halogen.

In Formula 3, D is aluminum (Al) or boron, and $R_b$, $R_c$, and $R_d$ are each independently a halogen atom, a hydrocarbon group having 1-20 carbon atoms, a hydrocarbon group having 1-20 carbon atoms substituted with halogen, or an alkoxy group having 1-20 carbon atoms.

In Formula 4, L is a neutral or cationic Lewis acid, $[L-H]^+$ and $[L]^+$ a Brönsted acid, Z is a group 13 element, and A is each independently a substituted or unsubstituted aryl group having 6-20 carbon atoms or a substituted or unsubstituted alkyl group having 1-20 carbon atoms.

Specifically, the compound represented by Formula 2 is at least one selected from the group consisting of methylaluminoxane, ethylaluminoxane, isobutylaluminoxane, and butylaluminoxane.

In addition, the compound represented by Formula 3 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron.

In addition, the compound represented by Formula 4 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

Preferably, the carrier may comprise at least one selected from the group consisting of silica, alumina, and magnesia.

More preferably, the transition metal compound and the cocatalyst compound may be supported on a single carrier. Specifically, the transition metal compound and the cocatalyst may be supported on silica.

In such an event, the amount of the transition metal compound supported on the carrier may be 0.5 to 3.0% by weight based on the total weight of the supported catalyst, and the amount of the cocatalyst compound supported on the carrier may be 20 to 30% by weight based on the total weight of the supported catalyst.

Preferably, the antistatic agent may comprise at least one selected from the group consisting of aluminum stearate, sodium stearate, calcium stearate, zinc stearate, aluminum tristearate, aluminum acetate, and zinc acetate.

The amount of the antistatic agent used in the primary treatment may be 0.01 to 5.0% by weight based on the total weight of the supported catalyst. In addition, the amount of the antistatic agent used in the secondary treatment may be 0.1 to 5.0% by weight based on the total weight of the supported catalyst.

Preferably, the antistatic agent may be dissolved or suspended in an amount of 0.01 to 5.0% by weight in at least one organic solvent selected from the group consisting of hexane, pentane, toluene, benzene, dichloromethane, diethyl ether, tetrahydrofuran, acetone, and ethyl acetate and then used to primarily treat the supported catalyst.

Advantageous Effects of the Invention

In the process for preparing a supported metallocene catalyst according to the embodiment of the present invention, it is possible to enhance the operational stability during olefin polymerization by treating the supported metallocene catalyst with an antistatic agent in an improved method.

BEST MODE FOR CARRYING OUT THE INVENTION

Hereinafter, the present invention will be described in more detail.

The process for preparing a supported metallocene catalyst for olefin polymerization comprises (1a) adding a cocatalyst compound to at least one transition metal compound; or (1b) adding a cocatalyst compound to a carrier; (2) supporting the transition metal compound on a carrier; and (3) primarily treating the supported catalyst with a solution or suspension of an antistatic agent; and (4) secondarily treating the supported catalyst with dry powder of an antistatic agent.

In step (1a), a cocatalyst compound is added to at least one transition metal compound.

Here, the transition metal compound may be one represented by the following Formula 1.

[Formula 1]

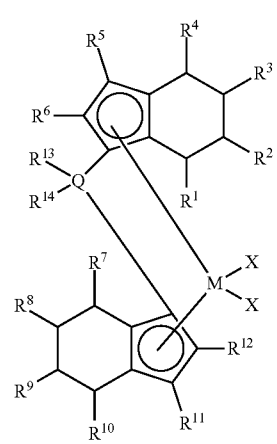

In Formula 1, M is a transition metal of Group 4 of the Periodic Table of the Elements. Specifically, M may be titanium (Ti), zirconium (Zr), or hafnium (Hf), more specifically, zirconium or hafnium.

Q is any one of carbon, silicon, germanium, and tin. Specifically, Q may be silicon.

X is each independently a halogen atom, an alkyl group having 1-10 carbon atoms, or an alkenyl group having 2-10 carbon atoms. Specifically, X may each independently be halogen, more specifically, chlorine.

$R^1$ to $R^{12}$ may each independently be one of a hydrogen atom, an alkyl group having 1-20 carbon atoms, a cycloalkyl group having 3-6 carbon atoms, and an aryl group having 6-14 carbon atoms, or when two adjacent $R^n$ and $R^{n+1}$ (where n is 1 to 11) among $R^1$ to $R^{12}$ form a mono- or multi-cyclic compound having 1-15 carbon atoms unsubstituted or substituted with an alkyl group having 1-4 carbon atoms, other Rs than $R^n$ and $R^{n+1}$ may each independently be one of hydrogen, an alkyl group having 1-20 carbon atoms, a cycloalkyl group having 3-6 carbon atoms, and an aryl group having 6-14 carbon atoms.

Specifically, the mono-cyclic compound may be a mono-cyclic compound of an aliphatic cyclic compound or a mono-cyclic compound of an aromatic cyclic compound.

The multi-cyclic compound may be a multi-cyclic compound of an aliphatic cyclic compound or a multi-cyclic compound of an aromatic cyclic compound or comprise a multi-cyclic compound of both an aliphatic cyclic compound and an aromatic cyclic compound.

$R^{13}$ and $R^{14}$ are each independently an alkyl group having 1-10 carbon atoms or an aryl group having 6-14 carbon atoms. Specifically, $R^{13}$ and $R^{14}$ may each independently be an alkyl group having 1-10 carbon atoms, more specifically, a methyl group.

Preferably, in Formula 1, M is zirconium, Q is silicon, X is each chlorine, $R^1$ to $R^{12}$ may each independently be one of a hydrogen atom, an alkyl group having 1-20 carbon atoms, a cycloalkyl group having 3-6 carbon atoms, and an aryl group having 6-14 carbon atoms, or when two adjacent $R^n$ and $R^{n+1}$ (where n is 1 to 11) among $R^1$ to $R^{12}$ form a mono- or multi-cyclic compound having 1-15 carbon atoms unsubstituted or substituted with an alkyl group having 1-4 carbon atoms, other Rs than $R^n$ and $R^{+1}$ may each independently be one of hydrogen, an alkyl group having 1-20 carbon atoms, a cycloalkyl group having 3-6 carbon atoms, and an aryl group having 6-14 carbon atoms, and $R^{13}$ and $R^{14}$ are each independently a methyl group.

More preferably, the transition metal compound represented by Formula 1 may be any one of the compounds represented by Formulae 1-1 and 1-16.

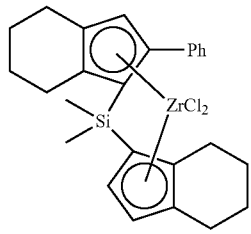

[Formula 1-4]

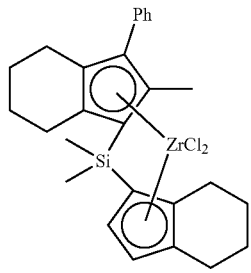

[Formula 1-5]

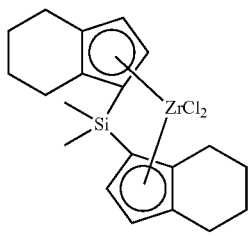

[Formula 1-1]

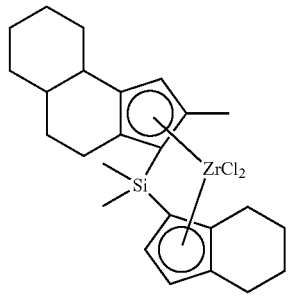

[Formula 1-6]

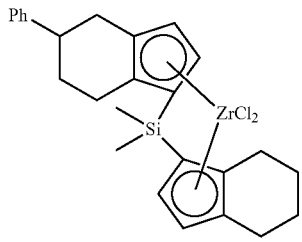

[Formula 1-2]

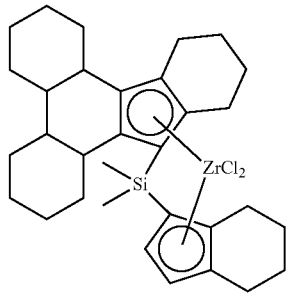

[Formula 1-7]

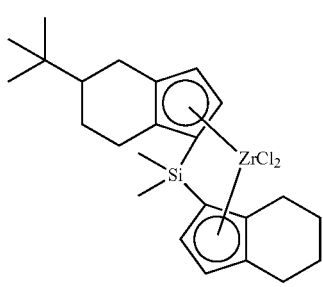

[Formula 1-3]

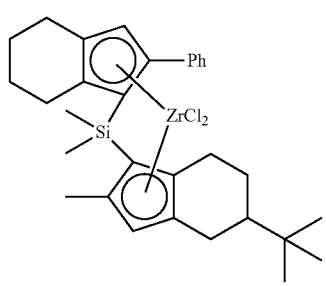

[Formula 1-8]

[Formula 1-9]

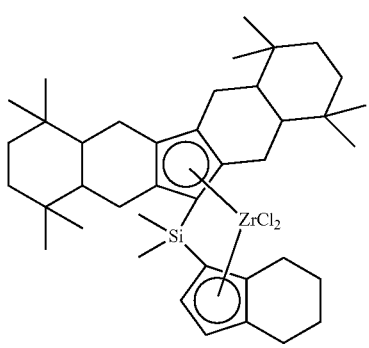

[Formula 1-10]

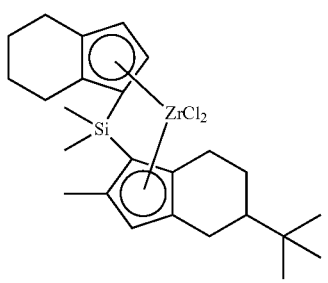

[Formula 1-11]

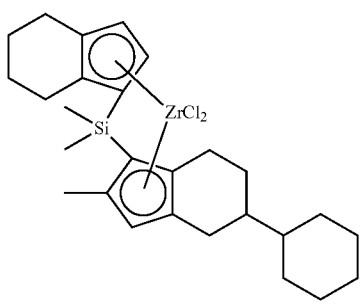

[Formula 1-12]

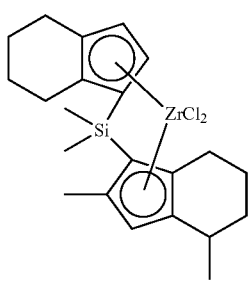

[Formula 1-13]

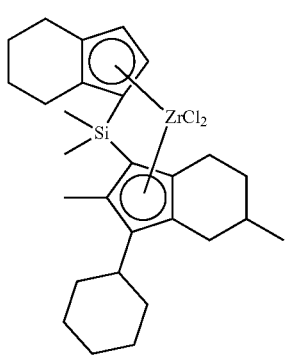

[Formula 1-14]

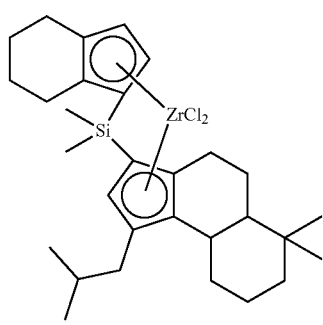

[Formula 1-15]

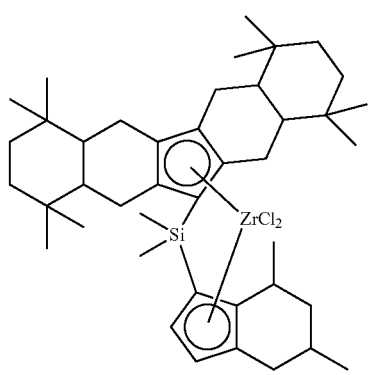

[Formula 1-16]

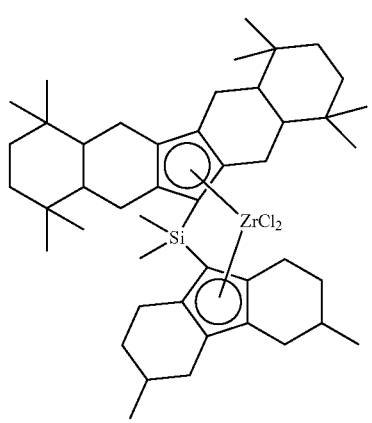

Most preferably, the transition metal compound represented by Formula 1 may be the compound represented by Formula 1-1.

Meanwhile, the cocatalyst compound in step (1a) may comprise at least one of a compound represented by Formula 2, a compound represented by Formula 3, and a compound represented by Formula 4.

[Formula 2]

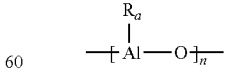

In Formula 2, n is an integer of 2 or more, and $R_a$ may each independently be a halogen atom, a hydrocarbon group having 1-20 carbon atoms, or a hydrocarbon group having 1-20 carbon atoms substituted with halogen. Specifically, $R_a$ may be methyl, ethyl, n-butyl, or isobutyl.

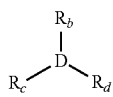

[Formula 3]

In Formula 3, D is aluminum (Al) or boron, and $R_b$, $R_c$, and $R_d$ are each independently a halogen atom, a hydrocarbon group having 1-20 carbon atoms, a hydrocarbon group having 1-20 carbon atoms substituted with halogen, or an alkoxy group having 1-20 carbon atoms. Specifically, when D is aluminum (Al), $R_b$, $R_c$, and $R_d$ may each independently be methyl or isobutyl, and when D is boron (B), $R_b$, $R_c$, and $R_d$ may each be pentafluorophenyl.

$$[L-H]^+[Z(A)_4]^- \text{ or } [L]^+[Z(A)_4]^- \quad \text{[Formula 4]}$$

In Formula 4, L is a neutral or cationic Lewis acid, $[L-H]^+$ and $[L]^+$ a Brönsted acid, Z is a group 13 element, and A is each independently a substituted or unsubstituted aryl group having 6-20 carbon atoms or a substituted or unsubstituted alkyl group having 1-20 carbon atoms. Specifically, $[LH]^+$ may be a dimethylanilinium cation, $[Z(A)_4]^-$ may be $[B(C_6F_5)_4]^-$, and $[L]^+$ may be $[(C_6H_5)_3C]^+$.

Examples of the compound represented by Formula 2 include methylaluminoxane, ethylaluminoxane, isobutylaluminoxane, butylaluminoxane, and the like. Preferred is methylaluminoxane. But it is not limited thereto.

Examples of the compound represented by Formula 3 include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyl dimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron. Preferred are trimethylaluminum, triethylaluminum, and triisobutylaluminum. But it is not limited thereto.

Examples of the compound represented by Formula 4 include triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra (p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

The procedure in which the cocatalyst compound is added to the at least one transition metal compound in step (1a) may be carried out in the presence of a solvent. Here, the solvent may be most organic solvents including aliphatic hydrocarbon solvents such as hexane and pentane, aromatic hydrocarbon solvents such as toluene and benzene, hydrocarbon solvents substituted with chlorine atoms such as dichloromethane, ether-based solvents such as diethyl ether and tetrahydrofuran, acetone, and ethyl acetate. Preferred is toluene or hexane, but it is not particularly limited thereto.

The procedure in which the cocatalyst compound is added to the at least one transition metal compound in step (1a) may be carried out at a temperature of 0 to 100° C., preferably at a temperature of 10 to 30° C.

In addition, once the cocatalyst compound has been added to the at least one transition metal compound in step (1a), it is sufficiently stirred for 5 minutes to 24 hours, preferably 30 minutes to 3 hours.

In step (1b), a cocatalyst compound is added to a carrier.

Here, the carrier may comprise a material containing a hydroxyl group on its surface. Preferably, a material that has been dried to remove moisture from its surface and has a highly reactive hydroxyl group and a siloxane group may be used. For example, the carrier may comprise at least one selected from the group consisting of silica, alumina, and magnesia. Specifically, silica, silica-alumina, and silica-magnesia dried at high temperatures may be used as a carrier. They usually contain oxides, carbonates, sulfates, and nitrates components such as $Na_2O$, $K_2CO_3$, $BaSO_4$, and $Mg(NO_3)_2$. In addition, they may comprise carbon, zeolite, magnesium chloride, and the like. However, the carrier is not limited thereto. It is not particularly limited as long as it can support at least one transition metal compound and a cocatalyst compound.

The carrier may have an average particle size of 10 to 250 μm, preferably an average particle size of 10 to 150 μm, and more preferably 20 to 100 μm.

The carrier may have a micropore volume of 0.1 to 10 cc/g, preferably 0.5 to 5 cc/g, and more preferably 1.0 to 3.0 cc/g.

The carrier may have a specific surface area of 1 to 1,000 $m^2/g$, preferably 100 to 800 $m^2/g$, more preferably 200 to 600 $m^2/g$.

In a preferred example, when the carrier is silica, the drying temperature of the silica may be 200 to 900° C. The drying temperature may preferably be 300 to 800° C., more preferably 400 to 700° C. If the drying temperature is lower than 200° C., there would be too much moisture so that the moisture on the surface and the cocatalyst may react. If it exceeds 900° C., the structure of the carrier may collapse.

The dried silica may have a concentration of hydroxy groups of 0.1 to 5 mmole/g, preferably 0.7 to 4 mmole/g, and more preferably 1.0 to 2 mmole/g. If the concentration of hydroxy groups is less than 01 mmole/g, the amount of supported cocatalyst may be low. If it exceeds 5 mmole/g, there may arise a problem that the catalyst component may be deactivated.

The procedure in which the cocatalyst compound is added to the carrier in step (1b) may be carried out in the presence of a solvent. Here, the solvent is substantially the same as described in step (1a) above.

The procedure in which the cocatalyst compound is added to the carrier in step (1b) may be carried out at a temperature of 0 to 100° C., preferably, at a temperature of 10 to 50° C.

In addition, once the cocatalyst compound has been added to the carrier in step (1b), it is sufficiently stirred for 5 minutes to 24 hours, preferably 30 minutes to 3 hours.

In step (2), the transition metal compound is supported on a carrier.

Specifically, the transition metal compound activated as a cocatalyst compound has been added to a transition metal compound in step (1a) is contacted with a carrier, or a transition metal compound is contacted with the carrier on which a cocatalyst compound has been supported in step (1b), whereby the transition metal compound is supported on a carrier.

The procedure in which the transition metal compound is supported on the carrier in step (2) may be carried out in the presence of a solvent. Here, the solvent is substantially the same as described in step (1a) above.

The procedure in which the transition metal compound is supported on the carrier in step (2) may be carried out at a temperature of 0 to 100° C., preferably at a temperature from room temperature to 90° C.

In addition, the procedure in which the transition metal compound is supported on the carrier in step (2) may be carried out as a mixture of the transition metal compound and the carrier is sufficiently stirred for 5 minutes to 24 hours, preferably 30 minutes to 3 hours.

Preferably, the transition metal compound and the cocatalyst compound may be supported on a single carrier. Specifically, the transition metal compound and the cocatalyst may be supported on silica.

In such an event, the amount of the transition metal compound supported on the carrier may be 0.5 to 3.0% by weight based on the total weight of the supported catalyst, and the amount of the cocatalyst compound supported on the carrier may be 20 to 30% by weight based on the total weight of the supported catalyst.

In step (3), the supported catalyst is primarily treated with a solution or suspension of an antistatic agent.

Preferably, the antistatic agent may comprise at least one selected from the group consisting of aluminum stearate, sodium stearate, calcium stearate, zinc stearate, aluminum tristearate, aluminum acetate, and zinc acetate, but it is not limited thereto. Preferably, the antistatic agent may be aluminum stearate.

The amount of the antistatic agent used in the primary treatment may be 0.01 to 5.0% by weight, preferably, 0.5 to 5.0% by weight, 0.5 to 4.0% by weight, 1.0 to 5.0% by weight, or 1.0 to 4.0% by weight, based on the total weight of the supported catalyst.

The antistatic agent is added to the supported catalyst during the primary treatment in a state in which it is homogeneously dissolved or suspended in a hydrocarbon solvent or the like. In such an event, the solvent may be substantially the same as used in step (1a), but it is not particularly limited thereto.

The content of the antistatic agent dissolved or suspended in the solvent is not particularly limited, but it may preferably be 0.01 to 5.0% by weight, more preferably 0.1 to 4.0% by weight.

In a preferred example, an antistatic agent is dissolved or suspended in an organic solvent in an amount of 0.01 to 5.0% by weight, which may then be introduced into the reactor using a cannula and stirred at 60° C. for 1 hour in a nitrogen atmosphere. However, the primary treatment method with an antistatic agent is not limited to this specific embodiment.

The process for preparing a supported metallocene catalyst according to an embodiment of the present invention may further comprise washing the supported catalyst as primarily treated with an antistatic agent with a solvent and drying it.

Specifically, upon completion of the primary treatment with an antistatic agent, it is allowed to stand for 3 minutes to 3 hours to precipitate the supported catalyst. Subsequently, the supernatant is removed to separate the supported catalyst, which is then washed with a solvent and dried for 6 to 48 hours at a temperature from room temperature to 80° C. to obtain a supported catalyst. Here, the solvent is substantially the same as described in step (1a) above.

In step (4), the supported catalyst is secondary treated with dry powder of an antistatic agent.

Here, the antistatic agent is substantially the same as described in step (3) above.

The amount of the antistatic agent used in the secondary treatment may be 0.1 to 5.0% by weight, preferably, 0.5 to 4.5% by weight, 1.0 to 4.0% by weight, or 1.0 to 3.5% by weight, based on the total weight of the supported catalyst.

In the secondary treatment, the antistatic agent in a dry powder form is uniformly mixed with the dried supported catalyst. Specifically, since dry mixing of the supported catalyst and the antistatic agent may make the catalyst flowability poor due to the sticky particle characteristics of the antistatic agent, it is preferable to uniformly mix them within a short period of time at a relatively low shear.

In an example of the present invention, for the secondary treatment with an antistatic agent, for example, a dried supported catalyst and an antistatic agent in a content of 0.1 to 5.0% by weight may be added to a mixer such as a conical screw mixer or a helical ribbon blender in a nitrogen atmosphere and dry-mixed for 5 minutes under conditions of a rotation speed of about 200 rpm at room temperature. However, the secondary treatment method with an antistatic agent is not limited to this specific embodiment.

When the amount of each of the antistatic agent in the primary and secondary treatments satisfies the above ranges, the catalyst thus prepared may have appropriate activity and flowability. If the content of the antistatic agent is too low, the effect of preventing static electricity is insignificant, making it difficult to secure stable operation. If the content of the antistatic agent is too high, the activity and flowability of the catalyst are deteriorated, and fine polymer powder would be produced, making it difficult to secure a stable operation.

As described above, the metallocene catalyst system of the present invention treated twice with at least one antistatic agent can minimize the static electricity generated by friction between polymer particles or friction between polymer particles and the inner wall of the reactor during the production of polyolefins through gas phase polymerization or slurry polymerization while it is possible to stably maintain the intrinsic activity of the catalyst. It is presumed that the metallocene catalyst system forms the particle size and bulk density of the polymers present in the reactor in a range in which the generation of static electricity due to friction can be minimized.

Meanwhile, an olefinic monomer may be polymerized in the presence of a catalyst prepared by the process for preparing a metallocene catalyst for olefin polymerization according to an embodiment of the present invention to prepared a polyolefin.

Here, the polyolefin may be a homopolymer of an olefinic monomer or a copolymer of an olefinic monomer and an olefinic comonomer.

The olefinic monomer is at least one selected from the group consisting of an alpha-olefin having 2-20 carbon atoms, a diolefin having 1-20 carbon atoms, a cycloolefin having 3-20 carbon atoms, and a cyclodiolefin having 3-20 carbon atoms.

For example, the olefinic monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or the like, and the polyolefin may be a homopolymer comprising only one olefinic monomer or a copolymer comprising two or more olefinic monomers exemplified above.

As an exemplary example, the polyolefin may be a copolymer in which ethylene and an alpha-olefin having 3-20 carbon atoms are copolymerized. Preferred is a copolymer in which ethylene and 1-hexene are copolymerized. But it is not limited thereto.

In such an event, the content of ethylene is preferably 55 to 99.9% by weight, more preferably 90 to 99.9% by weight. The content of the alpha-olefinic comonomer is preferably 0.1 to 45% by weight, more preferably 0.1 to 10% by weight.

The polyolefin according to an embodiment of the present invention may be prepared by polymerization reaction such as free radical, cationic, coordination, condensation, and addition, but it is not limited thereto.

As a preferred example, the polyolefin may be prepared by a gas phase polymerization method, a solution polymerization method, a slurry polymerization method, or the like. When the polyolefin is prepared by a solution polymerization method or a slurry polymerization method, examples of a solvent that may be used include aliphatic hydrocarbon solvents having 5-12 carbon atoms such as pentane, hexane, heptane, nonane, decane, and isomers thereof; aromatic hydrocarbon solvents such as toluene and benzene; hydrocarbon solvents substituted with chlorine atoms such as dichloromethane and chlorobenzene; and mixtures thereof, but it is not limited thereto.

EMBODIMENTS FOR CARRYING OUT THE INVENTION

Example

Hereinafter, the present invention is explained in detail with reference to the following examples and comparative examples. However, the following examples are intended to further illustrate the present invention. The scope of the present invention is not limited thereto only.

Preparation Example 1

A 100-ml autoclave in a glove box was charged with 502 mg (1 eq.) of rac-dimethylsilylenebis(indenyl)zirconium dichloride and a palladium/carbon (Pd/C) solution. The Pd/C solution was prepared by dispersing 59.5 mg (2.5 mol %) of Pd/C of 5% by weight in 25 ml of toluene. 30 bar of hydrogen was injected into the autoclave, and the mixture was then stirred at 70° C. for 5 hours. Upon completion of the reaction, the solution in the autoclave was filtered, and the resulting transition metal compound crystal was dissolved in 25 ml of toluene, followed by filtration thereof. The filtered solution was collected from which the solvent was removed under vacuum, whereby 0.91 g (90%) of a pale green solid compound of rac-dimethylsilyl bis(tetrahydroindenyl)zirconium dichloride (Formula 1-1) was obtained.

Example 1

43.2 g of methylaluminoxane (as a 10% by weight solution in toluene) was added to a 2-liter rounded glass reactor in a glove box. 0.2281 g of the transition metal compound obtained in Preparation Example 1 was dissolved in 130 ml of toluene, which was introduced into the reactor using a cannula, and the mixture was stirred at 25° C. for 1 hour. Meanwhile, 10.87 g of silica (XPO2402, Grace Davison) was added to the reactor, followed by stirring thereof at 75° C. for 3 hours in a nitrogen atmosphere. Subsequently, 0.616 g of aluminum distearate (Al-St) was suspended in 100 ml of toluene, which was introduced into the reactor using a cannula, followed by stirring thereof at 60° C. for 1 hour in a nitrogen atmosphere. Upon completion of the treatment with Al-St, when the solid/liquid was sufficiently separated, the supernatant was removed. The supported catalyst was washed three times with toluene and dried at 60° C. under vacuum for 30 minutes to obtain a supported catalyst in the form of a free-flowing powder. Thereafter, 0.462 g of Al-St powder was added to the dried catalyst for secondary treatment, thereby obtaining 15.4 g of a final supported catalyst. In the secondary treatment with an antistatic agent, the dried supported catalyst and the antistatic agent in a content of 3.0% by weight was charged to a helical ribbon blender and dry mixed for 5 minutes under conditions of a rotation speed of about 200 rpm at room temperature.

Example 2

A supported catalyst was obtained in the same manner as in Example 1, except that the amounts of aluminum distearate in the primary and secondary treatments were changed to 0.308 g and 0.231 g, respectively.

Example 3

A supported catalyst was obtained in the same manner as in Example 2, except that the amount of aluminum distearate in the primary treatment was changed to 0.616 g.

Comparative Example 1

A supported catalyst was obtained in the same manner as in Example 1, except that the secondary treatment with aluminum distearate was not carried out.

Comparative Example 2

A supported catalyst was obtained in the same manner as in Example 1, except that the primary treatment with aluminum distearate was not carried out and that the amount of aluminum distearate in the secondary treatment was changed to 0.539 g.

Comparative Example 3

A supported catalyst was obtained in the same manner as in Example 1, except that the amount of aluminum distearate in the primary treatment was changed to 0.231 g with a change of the treatment temperature to 30° C. and that the amount of aluminum distearate in the secondary treatment was changed to 0.616 g.

Comparative Example 4

A supported catalyst was obtained in the same manner as in Example 1, except that the amounts of aluminum distearate in the primary and secondary treatments were changed to 1.078 g and 0.231 g, respectively.

The preparation conditions for the catalysts in Examples 1 to 3 and Comparative Examples 1 to 4 are summarized in Table 1 below.

Test Example

Polyolefins were prepared in a fluidized-bed gas-phase reactor using each of the supported catalysts obtained in Examples 1 to 3 and Comparative Examples 1 to 4. Specifically, ethylene and 1-hexene were copolymerized in a fluidized-bed gas-phase reactor for 1 hour in the presence of 50 mg of each of the supported catalysts obtained in Examples 1 to 3 and Comparative Examples 1 to 4 and 0.5 ml of 1 M triisobutyl aluminum (TIBAL) as a scavenger. The temperature in the reactor was maintained at about 80° C., and the degree of polymerization of the ethylene/1-hexene copolymer prepared was adjusted by adding hydrogen in addition to ethylene and 1-hexene. Here, the pressure of ethylene was 14 kgf/cm$^2$, and the amount of 1-hexene was 15 cc. The time during which continuous operation was possible is shown in Table 1 below.

TABLE 1

| | Antistatic agent in primary treatment | | Antistatic agent in secondary treatment | Catalyst | | Continuous |
| --- | --- | --- | --- | --- | --- | --- |
| | Content (wt. %) | Temp. (° C.) | Content (wt. %) | activity (gPE/gCat-hr) | Catalytic flowability | operation time |
| Ex. 1 | 4.0 | 60 | 3.0 | 8,400 | Intermediate | 100 or more |
| Ex. 2 | 2.0 | 60 | 1.5 | 8,952 | Good | — |
| Ex. 3 | 4.0 | 60 | 1.5 | 7,300 | Intermediate | — |
| C. Ex. 1 | 2.0 | 60 | — | 7,800 | Good | 5 |
| C. Ex. 2 | — | — | 3.5 | 8,700 | Good | 0.75 |
| C. Ex. 3 | 1.5 | 30 | 4.0 | 9,100 | Good | 56 |
| C. Ex. 4 | 7.0 | 60 | 1.5 | 6,300 | Poor | — |

When Example 1 according to a specific example of the present invention is compared with Comparative Examples 1 to 3, stable continuous operation for 100 hours or more was possible in Example 1. In contrast, a polymer sheet was formed as the surface temperature of the reactor decreased after 5 hours of operation in Comparative Example 1. In Comparative Example 2, hot spots occurred at the beginning of the catalyst injection. In addition, in Comparative Example 3, a large amount of polymer sheets were formed after 56 hours of operation. Meanwhile, when Examples 2 and 3 according to a specific example of the present invention are compared with Comparative Example 4, the catalytic activity and catalyst flowability were properly maintained in Examples 2 and 3. In contrast, the catalytic activity and flowability were not good in Comparative Example 4 in which the content of the antistatic agent in the primary treatment was high. It is understood that this is because a significant amount of the antistatic agent that was not adsorbed to the pores of the carrier existed outside the supported catalyst.

INDUSTRIAL APPLICABILITY

The supported catalyst prepared according to the preparation process of the specific embodiment of the present invention can enhance tge operational stability during olefin polymerization.

The invention claimed is:

1. A process for preparing a supported metallocene catalyst for olefin polymerization, which comprises (1a) adding a cocatalyst compound to a transition metal compound; or (1b) adding a cocatalyst compound to a carrier; (2) forming a supported catalyst by supporting the transition metal compound obtained in step (1a) on a carrier, or by supporting a transition metal compound to the carrier obtained in step (1b); and (3) primarily treating the supported catalyst with a solution or suspension of an antistatic agent; and then washing the supported catalyst with a solvent and drying it, and (4) secondarily treating the supported catalyst with dry powder of an antistatic agent, wherein the transition metal compound is represented by Formula 1:

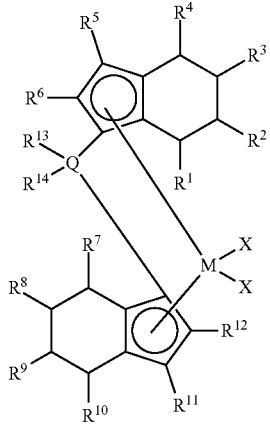

[Formula 1]

in Formula 1, M is a transition metal of Group 4 of the Periodic Table of the Elements;
Q is any one of carbon, silicon, germanium, and tin,
X is each independently a halogen atom, an alkyl group having 1-10 carbon atoms, or an alkenyl group having 2-10 carbon atoms,
$R^1$ to $R^{12}$ may each independently be one of a hydrogen atom, an alkyl group having 1-20 carbon atoms, a cycloalkyl group having 3-6 carbon atoms, and an aryl group having 6-14 carbon atoms, or when two adjacent $R^n$ and $R^{n+1}$ (where n is 1 to 11) among $R^1$ to $R^{12}$ form a mono- or multi-cyclic compound having 1-15 carbon atoms unsubstituted or substituted with an alkyl group having 1-4 carbon atoms, other Rs than $R^n$ and $R^{n+1}$ may each independently be one of hydrogen, an alkyl group having 1-20 carbon atoms, a cycloalkyl group having 3-6 carbon atoms, and an aryl group having 6-14 carbon atoms, and
$R^{13}$ and $R^{14}$ are each independently an alkyl group having 1-10 carbon atoms or an aryl group having 6-14 carbon atoms,
wherein the antistatic agent comprises at least one selected from the group consisting of aluminum stearate, sodium stearate, calcium stearate, zinc stearate, aluminum tristearate, aluminum acetate, and zinc acetate,
wherein the amount of the antistatic agent used in step (3) is 0.01 to 5.0% by weight based on the total weight of the supported catalyst, and the amount of the antistatic agent used in step (4) is 0.1 to 3.5% by weight based on the total weight of the supported catalyst, and
wherein the amount of the transition metal compound supported on the carrier is 0.5 to 3.0% by weight based on the total weight of the supported catalyst, and the amount of the cocatalyst compound supported on the carrier is 20 to 30% by weight based on the total weight of the supported catalyst.

2. The process for preparing a supported metallocene catalyst for olefin polymerization of claim 1, wherein, in Formula 1, M is zirconium, Q is silicon, X is each chlorine, $R^1$ to $R^{12}$ may each independently be one of a hydrogen atom, an alkyl group having 1-20 carbon atoms, a cycloalkyl group having 3-6 carbon atoms, and an aryl group having 6-14 carbon atoms, or when two adjacent $R^n$ and $R^{n+1}$ (where n is 1 to 11) among $R^1$ to $R^{12}$ form a mono- or multi-cyclic compound having 1-15 carbon atoms unsubstituted or substituted with an alkyl group having 1-4 carbon atoms, other Rs than $R^n$ and $R^{n+1}$ may each independently be one of hydrogen, an alkyl group having 1-20 carbon atoms, a cycloalkyl group having 3-6 carbon atoms, and an aryl group having 6-14 carbon atoms, and $R^{13}$ and $R^{14}$ are each independently a methyl group.

3. The process for preparing a supported metallocene catalyst for olefin polymerization of claim 1, wherein the transition metal compound represented by Formula 1 is any one of the compounds represented by Formulae 1-1 and 1-16:

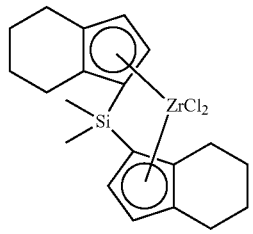

[Formula 1-1]

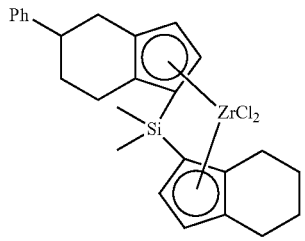

[Formula 1-2]

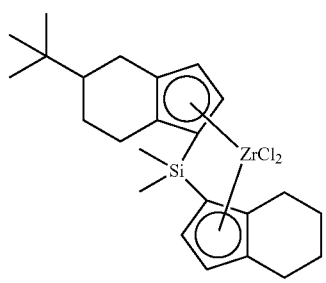

[Formula 1-3]

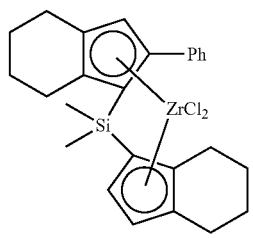

[Formula 1-4]

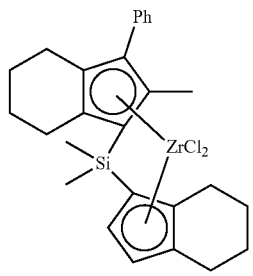

[Formula 1-5]

[Formula 1-6]
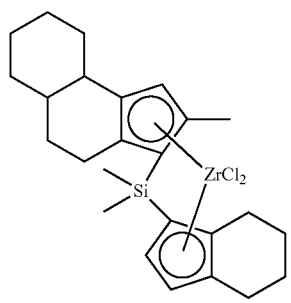
[Formula 1-7]
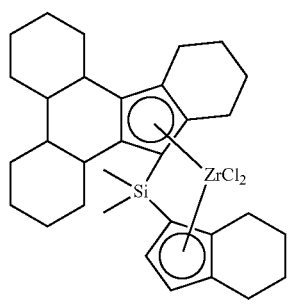
[Formula 1-8]
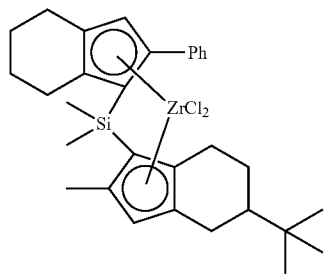
[Formula 1-9]
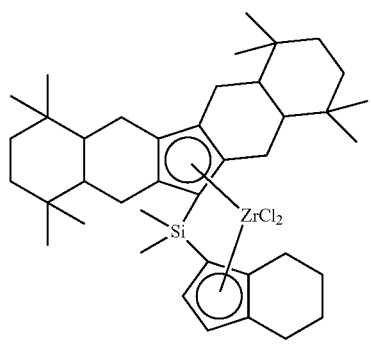
[Formula 1-10]
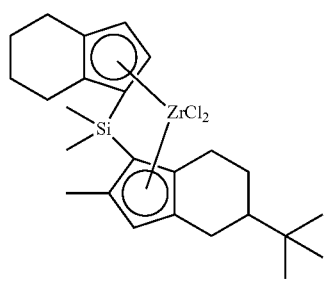
[Formula 1-11]
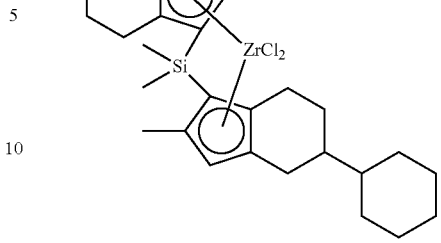
[Formula 1-12]
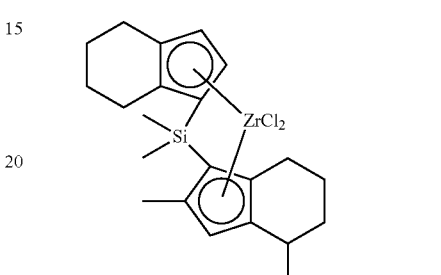
[Formula 1-13]
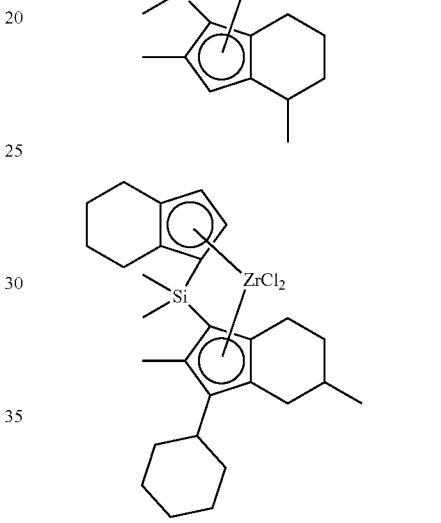
[Formula 1-14]
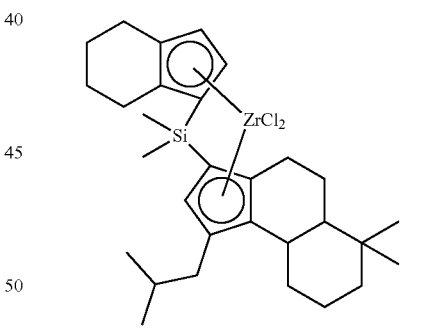
[Formula 1-15]
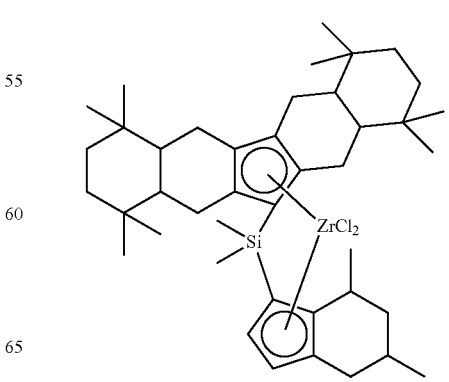

[Formula 1-16]

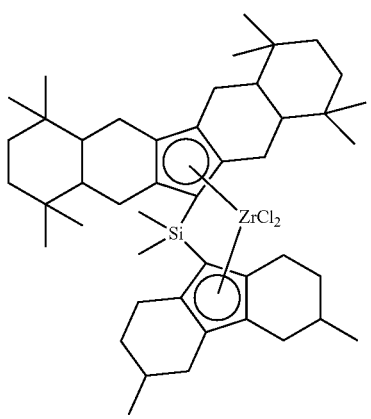

4. The process for preparing a supported metallocene catalyst for olefin polymerization of claim 3, wherein the transition metal compound represented by Formula 1 is the compound represented by Formula 1-1.

5. The process for preparing a supported metallocene catalyst for olefin polymerization of claim 1, wherein the cocatalyst compound is at least one selected from the group consisting of a compound represented by Formula 2, a compound represented by Formula 3, and a compound represented by Formula 4:

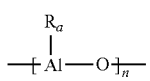

[Formula 2]

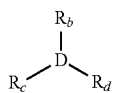

[Formula 3]

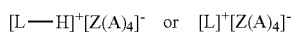

[Formula 4]

$[\text{L}—\text{H}]^+[Z(A)_4]^-$ or $[\text{L}]^+[Z(A)_4]^-$ in Formula 2, n is an integer of 2 or more, and $R_a$ may each independently be a halogen atom, $C_{1-20}$ hydrocarbon, or $C_{1-20}$ hydrocarbon substituted with halogen, in Formula 3, D is aluminum (Al) or boron, and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy, and in Formula 4, L is a neutral or cationic Lewis acid, $[\text{L-H}]^+$ and $[\text{L}]^-$ a Brönsted acid, Z is a group 13 element, and A is each independently substituted or unsubstituted $C_{6-20}$ aryl or substituted or unsubstituted $C_{1-20}$ alkyl.

6. The process for preparing a supported metallocene catalyst for olefin polymerization of claim 5, wherein the compound represented by Formula 2 is at least one selected from the group consisting of methylaluminoxane, ethylaluminoxane, isobutylaluminoxane, and butylaluminoxane.

7. The process for preparing a supported metallocene catalyst for olefin polymerization of claim 5, wherein the compound represented by Formula 3 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron.

8. The process for preparing a supported metallocene catalyst for olefin polymerization of claim 5, wherein the compound represented by Formula 4 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

9. The process for preparing a supported metallocene catalyst for olefin polymerization of claim 1, wherein the carrier comprises at least one selected from the group consisting of silica, alumina, and magnesia.

10. The process for preparing a supported metallocene catalyst for olefin polymerization of claim 9, wherein the transition metal compound and the cocatalyst compound are supported on a single carrier.

11. The process for preparing a supported metallocene catalyst for olefin polymerization of claim 10, wherein the transition metal compound and the cocatalyst compound are supported on silica.

12. The process for preparing a supported metallocene catalyst for olefin polymerization of claim 1, wherein, in step (3), the antistatic agent is dissolved or suspended in an amount of 0.01 to 5.0% by weight in at least one organic solvent selected from the group consisting of hexane, pentane, toluene, benzene, dichloromethane, diethyl ether, tetrahydrofuran, acetone, and ethyl acetate, and then used to treat the supported catalyst.

* * * * *